(12) United States Patent
Joseph, Jr. et al.

(10) Patent No.: US 9,499,730 B2
(45) Date of Patent: Nov. 22, 2016

(54) ELASTOMERIC COMPOSITION WITH IMPROVED THERMAL CONDUCTIVITY

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Aurelie Joseph, Jr., Clermont-Ferrand (FR); Benoit De Gaudemaris, Clermont-Ferrand (FR); Marc Sevignon, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 0 days.

(21) Appl. No.: 14/405,993

(22) PCT Filed: Jun. 10, 2013

(86) PCT No.: PCT/EP2013/061875
§ 371 (c)(1),
(2) Date: Dec. 5, 2014

(87) PCT Pub. No.: WO2013/186150
PCT Pub. Date: Dec. 19, 2013

(65) Prior Publication Data
US 2015/0184054 A1  Jul. 2, 2015

(30) Foreign Application Priority Data

Jun. 12, 2012  (FR) .................... 12 55473

(51) Int. Cl.
| | |
|---|---|
| C09K 5/14 | (2006.01) |
| C08K 3/00 | (2006.01) |
| C08K 3/04 | (2006.01) |
| B29C 43/24 | (2006.01) |
| B60C 1/00 | (2006.01) |
| C08K 3/36 | (2006.01) |
| C08K 5/01 | (2006.01) |
| B29K 9/00 | (2006.01) |
| B29K 507/04 | (2006.01) |
| B29L 7/00 | (2006.01) |

(52) U.S. Cl.
CPC ................ *C09K 5/14* (2013.01); *B29C 43/24* (2013.01); *C08K 3/0033* (2013.01); *C08K 3/04* (2013.01); B29K 2009/00 (2013.01); B29K 2507/04 (2013.01); B29L 2007/00 (2013.01); B60C 1/0016 (2013.04); C08K 3/36 (2013.01); C08K 5/01 (2013.01)

(58) Field of Classification Search
None
See application file for complete search history.

(56) References Cited

U.S. PATENT DOCUMENTS

| | | | | |
|---|---|---|---|---|
| 5,743,973 A | * | 4/1998 | Krishnan | ................ B60C 19/08 152/152.1 |
| 6,476,154 B1 | | 11/2002 | Maly | |
| 7,337,815 B2 | * | 3/2008 | Spadone | ............... B60C 1/0016 152/209.1 |
| 7,640,957 B2 | * | 1/2010 | Sandstrom | ................. 152/209.1 |
| 2004/0198890 A1 | | 10/2004 | Kanenari | |
| 2005/0159535 A1 | | 7/2005 | Spadone et al. | |
| 2007/0072984 A1 | | 3/2007 | Sandstrom | |

FOREIGN PATENT DOCUMENTS

| | | | |
|---|---|---|---|
| EP | 1557294 | | 7/2005 |
| EP | 1767570 | | 3/2007 |
| JP | 11080435 A | * | 3/1999 |
| JP | 2002020549 A | * | 1/2002 |
| JP | 2005002206 A | * | 1/2005 |
| JP | 2005220259 A | * | 8/2005 |
| JP | 2007182463 A | * | 7/2007 |

OTHER PUBLICATIONS

International Search Report for PCT/EP2013/061875 Dated Sep. 10, 2013.

* cited by examiner

*Primary Examiner* — Satya Sastri
(74) *Attorney, Agent, or Firm* — Dickinson Wright PLLC

(57) ABSTRACT

A rubber composition based on at least one diene elastomer, a filler that contains carbon black and an inorganic filler, and a crosslinking system, wherein the inorganic filler content is greater than or equal to 5 parts by weight per hundred parts by weight of elastomer, phr, and represents at most 50% as a weight fraction of the whole of the total filler of the composition, and wherein the carbon black includes at least one acetylene-derived carbon black, with a content of greater than 3 phr, the amount of acetylene-derived carbon black representing more than 50% of the carbon black present in the composition as a weight fraction, and wherein the composition contains a plasticizing oil or a plasticizing resin with a total content of plasticizing oil and plasticizing resin of less than 30 phr.

17 Claims, No Drawings

ELASTOMERIC COMPOSITION WITH IMPROVED THERMAL CONDUCTIVITY

This application is a 371 national phase entry of PCT/EP2013/061875, filed 10 Jun. 2013, which claims benefit of French Patent Application No. 1255473, filed 12 Jun. 2012, the entire contents of which are incorporated herein by reference for all purposes.

BACKGROUND

1 Field

The disclosure relates to a tire rubber composition based on -at least one diene elastomer, a filler that comprises carbon black and an inorganic filler and a crosslinking system, which composition has an improved thermal conductivity.

2 Description of Related Art

It is known that the treads of tires used for civil engineering are particularly sensitive to an increase in temperature. It is constantly sought to improve the properties of tires and in particular their wear resistance.

Such an improvement is generally obtained by the use, in the tread, of finer reinforcing fillers or by increasing the content of reinforcing fillers. Unfortunately whatever solution is adopted causes, in particular for civil engineering tires of very large sizes, very significant internal heating of the reinforcing belt which may lead to auto-ignition of the compound and a rapid degradation of the tire. It is therefore necessary to be able to accompany the improvements of these solutions with a great improvement in the removal of heat through the tread.

Various solutions have therefore been sought that make it possible to improve the heat dissipation properties of the tread of tires intended for civil engineering.

Thus, the idea arose to use reinforcing fillers having recognized thermal conductivity properties such as acetylene-derived carbon blacks. Thus, for example, the publication EP 1 767 570 proposes different blends of "more classical" carbon blacks, acetylene-derived carbon blacks and silica in treads combined with a high content of plasticizers (of the order of 100 parts per hundred parts by weight of elastomer, phr).

However, the use of such an amount of plasticizers leads to a degradation of the mechanical and hysteresis properties of the treads thus obtained.

SUMMARY

The applicant companies have surprisingly discovered that a specific blend of acetylene-derived carbon black and inorganic filler made it possible to obtain improved thermal conductivity properties (despite the presence of an inorganic filler known, on the contrary, for not being thermally conductive) without requiring the use of a high content of plasticizers.

One subject of the invention is therefore a rubber composition based on at least one diene elastomer, a filler that comprises carbon black and an inorganic filler, and a crosslinking system, characterized in that the inorganic filler content is greater than or equal to 5 parts by weight per hundred parts by weight of elastomer, phr, and represents at most 50% as a weight fraction of the total filler of the composition, and that the carbon black comprises at least one acetylene-derived carbon black, with a content of greater than 3 phr, the amount of acetylene-derived carbon black representing more than 50% of the carbon black present in the composition as a weight fraction, and in that the composition comprises a plasticizing oil and/or a plasticizing resin with a total content of plasticizing oil and plasticizing resin of less than 30 phr.

According to one preferred embodiment of the invention, the amount of acetylene-derived carbon black represents more than 50% of the total filler present in the composition, as a weight fraction.

According to another preferred embodiment of the invention, the inorganic filler content represents more than 30% as a weight fraction of the total filler of the composition, and more preferably still more than 40% as a weight fraction of the total filler of the composition. Preferably, the inorganic filler of the composition comprises silica, and more preferably still a precipitated silica.

According to another preferred embodiment of the invention, the diene elastomer of the composition is selected from the group consisting of polybutadienes, synthetic polyisoprenes, natural rubber, butadiene copolymers, isoprene copolymers and mixtures of these elastomers.

The invention, in another embodiment, also relates to a finished or semi-finished article, a tread, a tire and a semi-finished product comprising a composition as described above.

The invention, in another embodiment, also relates to a process for preparing a rubber composition based on at least one diene elastomer, a filler that comprises carbon black and an inorganic filler, and a crosslinking system, in which the inorganic filler content is greater than or equal to 5 parts by weight per hundred parts by weight of elastomer, phr, and represents at most 50% as a weight fraction of the whole of the total filler of the composition, and in which the carbon black comprises at least one acetylene-derived carbon black, with a content of greater than 3 phr, the amount of acetylene-derived carbon black representing more than 50% of the carbon black present in the composition as a weight fraction, and in which the composition comprises a plasticizing oil and/or a plasticizing resin with a total content of plasticizing oil and plasticizing resin of less than 30 phr, and which comprises the following steps:

incorporating the filler into the diene elastomer, in a mixer, by thermomechanically kneading everything, in one or more steps, until a maximum temperature of between 130° C. and 200° C. is reached, cooling the combined mixture to a temperature of less than 100° C., then incorporating: the vulcanization system;

kneading everything up to a maximum temperature of less than 120° C.;

extruding or alendaring the rubber composition thus obtained.

DETAILED DESCRIPTION OF SPECIFIC EMBODIMENTS

Measurements and Tests Used

The rubber compositions are characterized, before and after curing, as indicated below.

Mooney Plasticity

Use is made of an oscillating consistometer as described in the French standard NF T 43-005 (1991). The Mooney plasticity measurement is carried out according to the following principle: the composition in the uncured state (i.e. before curing) is moulded in a cylindrical chamber heated to 100° C. After preheating for one minute, the rotor rotates within the test specimen at 2 rpm and the working torque for maintaining this movement is measured after rotating for 4 minutes. The Mooney plasticity (ML 1+4) is expressed in "Mooney units" (MU, with 1 MU=0.83 Newton.metre).

Enemy at Break

The tear resistance indices are measured at 100° C. The load to be exerted in order to obtain failure, or breaking load (FRD, in MPa), is in particular determined and the strain at break (DRD, in %) is measured on a test specimen of dimensions 10×105×2.5 mm that is notched in the centre of its length to a depth of 5 mm, in order to bring about the failure of the test specimen. Thus, it is possible to determine the energy to bring about the failure (energy at break) of the test specimen, which is the product of FRD and DRD.

Dynamic Property

The dynamic property $\tan(\delta)_{max}$ is measured on a viscosity analyser (Metravib VA4000), according to the standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded under standard temperature conditions (23° C.) according to the standard ASTM D 1349-99, or, depending on the case, at a different temperature; in the examples the measurements are carried out at 60° C. A strain amplitude sweep is carried out from 0.1% to 45% (forward cycle), then from 45% to 0.1% (return cycle). The result made use of is the loss factor $\tan(\delta)$. For the return cycle, the maximum value of $\tan(\delta)$ observed, denoted by $\tan(\delta)_{max}$, is indicated.

Thermal Conductivity Measurement of the Compounds

The thermal conductivity is measured at 25° C. by the guarded hot plate (GHP) method. Measurement protocol:

Sample Preparation

In order to determine the thermal conductivity the samples are presented in the form of a cube with sides of 15 mm and a thickness of around 2.5 mm.

Measuring Device.

The cubic sample (w=15 mm, H=2.5 mm) is placed between two exchangers. The temperatures of the exchangers are kept constant until a permanent thermal equilibrium is obtained. In our case, the exchangers are at 20° C. and 30° C. for a measurement at 25° C.

Two thermocouples (d=80 µm) are positioned at the surface of the exchangers, the temperature reading is carried out over the axis of the cube. In order to prevent heat losses the whole of the device is insulated using a heat guard of the same material. In steady state, the following 4 temperatures are measured:

$T_1$: hot exchanger
$T_2$: heater (lower surface)
$T_3$: heater (upper surface)
$T_4$: cold exchanger
U: voltage at the terminals of the heater
I: intensity of the current in the heater
S: cross section of the sample
L: length of the sample
$L_{4-3}$: actual length of the sample between heater and cold exchanger If $T_1=T_2$, the heat flux al dissipated in the heater is entirely directed towards the sample.

Processing of the Measurements—Results

In steady state, the temperature gradient in the sample is uniform. The heat flux density in the sample is given by:

$$\frac{\phi}{S} = \frac{UI}{L^2} = \lambda \frac{T_4 - T_3}{L_{4-3}}$$

The thermal conductivity λ of the sample is deduced therefrom:

$$\lambda = \frac{UI}{L^2} \frac{L_{4-3}}{T_4 - T_3}$$

In the present description, unless expressly indicated otherwise, all the percentages (%) shown are % by weight. Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

Diene Elastomer

A "diene" elastomer or rubber should be understood, in a known manner, to mean an elastomer resulting at least in part (i.e., a homopolymer or a copolymer) from diene monomers (monomers bearing two carbon-carbon double bonds which may or may not be conjugated).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Given these definitions, a diene elastomer capable of being used in the compositions in accordance with an embodiment of the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with an unconjugated diene monomer having from 6 to 12 carbon atoms, such as, for example, the elastomers obtained from ethylene and propylene with an unconjugated diene monomer of the aforementioned type, such as, in particular, 1,4-hexadiene, ethylidene norbornene or dicyclopentadiene; and (d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that an embodiment of the present invention is preferably implemented with essentially unsaturated diene elastomers, in particular of type (a) or (b) above.

The following are suitable in particular as conjugated dienes: 1,3-butadiene, 2-methyl-1,3-butadiene, 2,3-di($C_1$-$C_5$ alkyl)-1,3-butadienes, such as for example 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the commercial "vinyl-toluene" mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure, which depends on the polymerization conditions used, in particular on the presence or absence of a modifying and/or randomizing agent, and on the amounts of modifying and/or randomizing agent employed. The elastomers may, for example, be block, statistical, sequential or microsequential elastomers and may be prepared in dispersion or in solution; they may be coupled and/or star-branched or else functionalized with a coupling and/or star-branching or functionalization agent. Mention may be made for example, for coupling to carbon black, of functional groups comprising a C—Sn bond or aminated functional groups, such as amino/benzophenone for example; mention may be made for example, for coupling to a reinforcing inorganic filler such as silica, of silanol or polysiloxane functional groups having a silanol end (such as described for example in FR 2 740 778 or U.S. Pat. No. 6,013,718 and WO 2008/141702), alkoxysilane groups (such as described for example in FR 2 765 882 or U.S. Pat. No. 5,977,238), carboxyl groups (such as described for example in WO 01/92402 or U.S. Pat. No. 6,815,473, WO 2004/096865 or US 2006/0089445) or else polyether groups (such as described for example in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadienestyrene copolymers and in particular those having a Tg (glass transition temperature, Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadieneisoprene copolymers and especially those having an isoprene content of between 5% and 90% by weight and a Tg of −40° C. to −80° C., or isoprenestyrene copolymers and especially those having a styrene content of between 5% and 50% by weight and a Tg of between −5° C. and −50° C. In the case of butadienestyreneisoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadienestyreneisoprene copolymer having a Tg of between −5° C. and −70° C., are suitable in particular.

To summarize, the diene elastomer or elastomers of the composition according to an embodiment of the invention are preferably selected from the group of highly unsaturated diene elastomers consisting of polybutadienes (abbreviated to "BRs"), synthetic polyisoprenes (IRs), natural rubber (NR), butadiene copolymers, isoprene copolymers, and mixtures of these elastomers. Such copolymers are more preferably selected from the group consisting of butadienestyrene copolymers (SBRs), isoprenebutadiene copolymers (BIRs), isoprenestyrene copolymers (SIRs) and isoprenebutadienestyrene copolymers (SBIRs).

According to one particular embodiment, the diene elastomer is predominantly (i.e., for more than 50 phr) an SBR, whether an SBR prepared in emulsion ("ESBR") or an SBR prepared in solution ("SSBR"), or an SBRBR, SBRNR (or SBRIR), BRNR (or BRIR) or else SBRBRNR (or SBR-BRIR) blend (mixture). In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another particular embodiment, the diene elastomer is predominantly (for more than 50 phr) an isoprene elastomer. This is the case in particular when the compositions of the invention are intended to constitute, in the tires, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other inner liners providing the interface between the abovementioned regions of the tires.

The expression "isoprene elastomer" is understood to mean, in a known manner, an isoprene homopolymer or copolymer, in other words a diene elastomer selected from the group consisting of natural rubber (NR), synthetic polyisoprenes (IRs), the various copolymers of isoprene and the mixtures of these elastomers. Mention will in particular be made, among isoprene copolymers, of isobuteneisoprene copolymers (butyl rubber—IIR), isoprenestyrene copolymers (SIRs), isoprenebutadiene copolymers (BIRs) or isoprenebutadienestyrene copolymers (SBIRs). This isoprene elastomer is preferably natural rubber or a synthetic cis-1,4-polyisoprene; use is preferably made, among these synthetic polyisoprenes, of the polyisoprenes having a content (mol %) of cis-1,4-bonds of greater than 90%, more preferably still of greater than 98%.

According to another particular embodiment, especially when it is intended for a tire sidewall or for an airtight inner liner of a tubeless tire (or other air-impermeable component), the composition in accordance with the invention may contain at least one essentially saturated diene elastomer, in particular at least one EPDM copolymer or one butyl rubber (optionally chlorinated or brominated), whether these copolymers are used alone or as a mixture with highly unsaturated diene elastomers as mentioned above, in particular NR or IR, BR or SBR.

According to another preferred embodiment of the invention, the rubber composition comprises a blend of a (one or more) "high Tg" diene elastomer having a Tg of between −70° C. and 0° C. and of a (one or more) "low Tg" diene elastomer having a Tg of between −110° C. and −80° C., more preferably between −105° C. and −90° C. The high Tg elastomer is preferably selected from the group consisting of S-SBRs, E-SBRs, natural rubber, synthetic polyisoprenes (having a content (mol %) of cis-1,4-linkages preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) having a content (mol %) of cis-1,4-linkages of greater than 90%. According to another particular embodiment of the invention, the rubber composition comprises, for example, from 30 to 100 phr, in particular from 50 to 100 phr, of a high Tg elastomer as a blend with 0 to 70 phr, in particular from 0 to 50 phr, of a low Tg elastomer; according to another example, it comprises, for the whole of the 100 phr, one or more SBR(s) prepared in solution.

According to another particular embodiment of the invention, the diene elastomer of the composition according to the invention comprises a blend of a BR (as low Tg elastomer) having a content (mol %) of cis-1,4-linkages of greater than 90% with one or more S-SBRs or E-SBRs (as high Tg elastomer(s)).

The composition according to an embodiment of the invention may contain a single diene elastomer or a mixture of several diene elastomers, it being possible for the diene elastomer or elastomers to be used in combination with any type of synthetic elastomer other than a diene elastomer, or even with polymers other than elastomers, for example thermoplastic polymers.

Filler

The compositions in accordance with an embodiment of the invention comprise, as reinforcing filler known for its abilities to reinforce a rubber composition that can be used for manufacturing tires, at least carbon black and an inorganic filler, the carbon black comprises at least one acetylene-derived carbon black. For an embodiment of the present invention, it is possible to use any type of reinforcing filler known for its abilities to reinforce a rubber composition that can be used for the manufacture of tires, for example an organic filler such as carbon black, a reinforcing inorganic filler such as silica, or else a blend of these two types of filler, especially a blend of carbon black and silica.

All carbon blacks, in particular blacks of the HAF, ISAF or SAF type, conventionally used in tires ("tire-grade" blacks) are suitable as carbon blacks other than the acetylene-derived carbon blacks. Mention will more particularly be made, among these tire-grade blacks, of the reinforcing carbon blacks of the 100, 200 or 300 series (ASTM grades), such as for example the N115, N134, N234, N326, N330, N339, N347 or N375 blacks, or else, depending on the applications targeted, the blacks of higher series (for example N400, N660, N683 or N772). The carbon blacks could for example already be incorporated into the isoprene elastomer in the form of a masterbatch (see for example applications WO 97/36724 and WO 99/16600).

The acetylene-derived carbon blacks, also often denoted by the expression "acetylene blacks", are carbon blacks manufactured from acetylene as starting material. The acetylene blacks used may consist of any acetylene black known to a person skilled in the art, in particular the acetylene blacks having a BET surface area and a CTAB specific surface area that are both greater than 40 m$^2$/g, and a COAN structure of greater than 80 ml/100 g. Particularly suitable as acetylene-derived carbon blacks are the "acetylene carbon blacks" sold by the company Chevron Chemical Company, acetylene-derived carbon blacks sold by the company Denki Kagaku Kogyo, such as "Denka Black" or else, by way of example, acetylene-derived carbon blacks sold by the company SN2A such as "Y70".

The compositions in accordance with the invention may also contain organic fillers other than carbon blacks. For example, mention may be made of the functionalized polyvinylaromatic organic fillers as described in applications WO-A-2006/069792 and WO-A-2006/069793.

The expression "inorganic filler" should be understood in the present application, by definition, to mean any inorganic or mineral filler, whatever its colour and its origin (natural or synthetic), also referred to as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black. Such a filler is generally characterized, in a known manner, by the presence of functional groups, in particular hydroxyl (OH) groups, at its surface, requiring, in order to be used as a reinforcing filler, the use of a coupling agent or system intended to provide a stable chemical bond between the isoprene elastomer and said filler.

Such an inorganic filler may therefore be used with a coupling agent in order to enable the reinforcement of the rubber composition in which it is included. It may also be used with a covering agent (which does not provide a bond between the filler and the elastomeric matrix) in addition to a coupling agent or not (in this case the inorganic filler does not play a reinforcing role).

The physical state in which the inorganic filler is present is not important, whether it is in the form of a powder, of microbeads, of granules, of balls or any other appropriate densified form. Of course, the expression "inorganic filler" is also understood to mean mixtures of various inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as inorganic fillers. The silica used may be any silica known to those skilled in the art, especially any precipitated or pyrogenic silica having a BET surface area and also a CTAB specific surface area that are both less than 450 m$^2$/g, preferably ranging from 30 to 400 m$^2$/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface area as described in application WO 03/16837.

When the compositions of an embodiment of the invention are intended for tire treads having a low rolling resistance, the inorganic filler used, in particular if it is silica, preferably has a BET surface area of between 45 and 400 m$^2$/g, more preferably of between 60 and 300 m$^2$/g.

Preferably, the inorganic fillers for which the mean size (by weight) is between 20 and 300 nm, more preferably between 20 and 150 nm, are particularly suitable for the present invention. This mean size is conventionally measured after dispersion, by ultrasonic deagglomeration, of the filler to be analysed in water or an aqueous solution containing a surfactant. For an inorganic filler such as silica, the measurement is carried out using an X-ray detection centrifugal sedimentometer of "XDC" ("X-ray disc centrifuge") type, sold by Brookhaven Instruments, according to the following procedure. A suspension of 3.2 g of sample of inorganic filler to be analysed in 40 ml of water is produced by the action over 8 minutes, at 60% power (60% of the maximum position of the "output control"), of a 1500 W ultrasonic probe (¾ inch Vibracell sonicator sold by Bioblock); after sonication, 15 ml of the suspension are introduced into the disc rotating at a speed that varies between 3000 and 6000 rpm (the speed being adjusted as a function of the mean size of the filler: the smaller the size, the higher the speed); after sedimentation for 120 minutes, the weight distribution of the particle sizes and the mean size, by weight, of the particles dw are calculated by the software of the "XDC" sedimentometer (dw=Σ(ni di5) /Σ(ni di4) with ni being the number of objects of the size class or diameter di).

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "asymmetrical" depending on their particular structure, as described, for example, in applications WO 03/002648 (or US 2005/016651) and WO 03/002649 (or US 2005/016650).

Particularly suitable, without the definition below being limiting, are "symmetrical" silane polysulphides corresponding to the following general formula (III):

$$Z\text{-}A\text{-}S_x\text{-}A\text{-}Z, \text{ in which:} \quad (III)$$

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, especially $C_1$-$C_4$, alkylenes, in particular propylene);
Z corresponds to one of the formulae below:

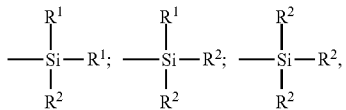

in which:
the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);
the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_4$ alkoxyls, in particular methoxyl and ethoxyl).

In the case of a mixture of alkoxysilane polysulphides corresponding to the above formula (III), in particular the standard commercially available mixtures, the mean value of the "x" subscripts is a fractional number preferably between 2 and 5, more preferably close to 4. However, the invention may also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulphides (in particular disulphides, trisulphides or tetrasulphides), more particularly bis(monoethoxydimethylsilylpropyl)tetrasulphide, such as described in patent application WO 02/083782 (or US 2004/132880).

Mention will in particular be made, as coupling agents other than an alkoxysilane polysulphide, of bifunctional POSs (polyorganosiloxanes) or else of hydroxysilane polysulphides ($R^2$=OH in the above formula III), such as described in patent applications WO 02/30939 (or U.S. Pat. No. 6,774,255) and WO 02/31041 (or US 2004/051210), or else of silanes or POSs bearing azodicarbonyl functional groups, such as described, for example, in patent applications WO 2006/125532, WO 2006/125533 and WO 2006/125534.

As covering agents, processing aids will generally be considered that are capable, as is known, owing to an improvement in the dispersion of the inorganic filler in the rubber matrix and a lowering of the viscosity of the compositions, of improving their ease of processing in the uncured state, these processing aids being for example hydrolysable silanes, such as alkylalkoxysilanes (especially alkyltriethoxysilanes), polyols, polyethers (for example polyethylene glycols), primary, secondary or tertiary amines (for example trialkanolamines), hydroxylated or hydrolysable POSs, for example α,ω-dihydroxypolyorganosiloxanes (especially α,ω-dihydroxypolydimethylsiloxanes), and fatty acids such as, for example, stearic acid.

In the rubber compositions in accordance with the invention, the content of coupling agent is preferably between 0.1% and 12% by weight of the inorganic filler for a CTAB surface area of 160 m²/g, more preferably between 4% and 10% by weight of the inorganic filler for a CTAB surface area of 160 m²/g; and/or the content of covering agent is preferably between 0.1% and 20% by weight of the inorganic filler for a CTAB surface area of 160 m²/g, more preferably between 5% and 20% by weight of the inorganic filler for a CTAB surface area of 160 m²/g, it being possible for the content of coupling agent to be adjusted to the specific surface area of the filler.

The content of inorganic filler present in the compositions in accordance with an embodiment of the invention is greater than or equal to 5 parts by weight per hundred parts by weight of elastomer, phr, and represents at most 50% as a weight fraction of the total filler of the composition, and the content of acetylene-derived carbon black is greater than 3 phr, the amount of acetylene-derived carbon black representing more than 50% of the carbon black present in the composition, as a weight fraction.

Preferably, the amount of acetylene-derived carbon black represents more than 50% of the total filler present in the composition, as a weight fraction.

According to one preferred embodiment of the invention, the amount of acetylene-derived carbon black represents more than 90% of the carbon black present in the composition, as a weight fraction, and more preferably still it represents 100% of the carbon black present in the composition.

Preferably, the total filler content varies from 20 to 150 phr, preferably from 30 to 90 phr and more preferably still from 30 to 70 phr.

The acetylene-derived carbon black content is preferably greater than or equal to 10 phr. The inorganic filler content is preferably greater than or equal to 8 phr.

More preferably, the acetylene-derived carbon black content varies from 10 to 40 phr and the inorganic filler content varies from 8 to 30 phr, and more preferably still the inorganic filler content varies from 12 to 30 phr.

According to another preferred embodiment, the inorganic filler content represents at most 30% of the total filler as a weight fraction and more preferably still the inorganic filler content represents more than 40% as a weight fraction of the total filler of the composition.

Plasticizing Oil and Resin

The compositions in accordance with the invention may comprise a plasticizing oil and/or a plasticizing resin.

The expressions "plasticizing oil" or "plasticizing resin" are understood to mean an oil or a resin having the customary function of facilitating the processing, by reducing the Mooney plasticity.

More specifically, these plasticizing oils, which are more or less viscous, are defined as being liquids (i.e., as a reminder, substances that have the ability to eventually take on the shape of their container) at ambient temperature (23° C.), in contrast, in particular, to resins or rubbers which are by nature solids.

Preferably, the extending oil is selected from the group consisting of polyolefin oils (i.e. oils derived from the polymerization of olefins, monoolefins or diolefins), paraffinic oils, naphthenic oils (of low or high viscosity), aromatic oils, mineral oils, and mixtures of these oils.

Furthermore, in a manner known to a person skilled in the art, the expression "plasticizing resin" is reserved in the present application, by definition, for a compound which is, on the one hand, solid at ambient temperature (23° C.) (in contrast to a liquid plasticizing compound such as an oil), and, on the other hand, compatible (i.e. miscible at the content used, typically greater than 5 phr) with the rubber composition for which it is intended, so as to act as a true diluting agent.

Hydrocarbon resins are polymers well known to a person skilled in the art, which are miscible by nature in the diene elastomer compositions when they are additionally described as being "plasticizing". They have been described, for example, in the work entitled "*Hydrocarbon Resins*" by R. Mildenberg, M. Zander and G. Collin (New York, VCH, 1997, ISBN 3-527-28617-9), chapter 5 of which is devoted to their applications, in particular in the tire rubber field (5.5. "*Rubber Tires and Mechanical Goods*"). They may be aliphatic, aromatic or else of aliphati/caromatic type, i.e. based on aliphatic and/or aromatic monomers. They may be natural or synthetic, whether or not based on petroleum (if such is the case, they are also known as petroleum resins). They are preferably exclusively hydrocarbon-based, that is to say that they comprise only carbon and hydrogen atoms.

The compositions in accordance with an embodiment of the invention may thus comprise one or more plasticizing oils and/or one or more plasticizing resins as long as the total content of plasticizing oil(s) and of plasticizing resin(s) used is less than or equal to 30 phr, preferably it varies from 0 to 5 phr. More preferably still, the composition is devoid of plasticizing oil and plasticizing resin.

Various Additives

The rubber compositions in accordance with an embodiment of the invention may also comprise all or some of the usual additives customarily used in the elastomer compositions intended for the manufacture of tires or semi-finished products for tires, such as, for example, other plasticizers (other than the plasticizing system of the invention), preferably non-aromatic or very slightly aromatic plasticizers, for example naphthenic or paraffinic oils, MES or TDAE oils, glycerol esters (in particular trioleates), especially natural esters, such as rapeseed or sunflower vegetable oils, pigments, protective agents, such as antiozonants, antioxidants, anti-fatigue agents, a crosslinking system based either on sulphur or on sulphur donors and/or on peroxide and/or on bismaleimides, vulcanization accelerators, vulcanization activators or anti-reversion agents.

These compositions may also contain, in addition to coupling agents, coupling activators, agents for covering the inorganic fillers or more generally processing aids capable, in a known manner, by virtue of an improvement in the dispersion of the filler in the rubber matrix and a reduction in the viscosity of the compositions, of improving their processability in the uncured state, these agents being, for example, hydrolysable silanes such as alkylalkoxysilanes, polyols, polyethers, primary, secondary or tertiary amines or hydroxylated or hydrolysable polyorganosiloxanes.

Manufacture of the Rubber Compositions

The compositions are manufactured in appropriate mixers using two successive preparation phases well known to a person skilled in the art: a first phase of thermomechanical working or kneading at high temperature, up to a maximum temperature of between 110° C. and 190° C., preferably between 130° C. and 180° C., followed by a second phase of mechanical working up to a lower temperature, typically of less than 110° C., for example between 40° C. and 100° C., during which finishing phase the crosslinking system is incorporated.

The process in accordance with an embodiment of the invention for preparing a rubber composition for a tire inner liner comprises the following stages:

incorporating the filler into an elastomer during a first stage by thermomechanically kneading everything, in one or more steps, until a maximum temperature of between 110° C. and 190° C. is reached;

then incorporating a crosslinking system during a second stage;

kneading everything up to a maximum temperature of less than 110° C.

These two stages may be carried out consecutively in the same mixer or may be separated by a stage of cooling down to a temperature below 100° C., the last stage then being carried out using a second mixer.

By way of example, the first phase is carried out in a single thermomechanical stage during which all the necessary base constituents (elastomer, filler and coupling agent if necessary and graphite) are firstly introduced into a suitable mixer, such as a standard internal mixer, and then secondly, for example after kneading for one to two minutes, the other additives, optional covering agents or complementary processing aids, with the exception of the crosslinking system, are introduced. After the mixture thus obtained has cooled, the crosslinking system is then incorporated in an external mixer, such as an open mill, maintained at low temperature (for example between 40° C. and 100° C.). All ingredients are then mixed for a few minutes, for example between 2 and 15 min.

The crosslinking system is preferably a vulcanization system, i.e. a system based on sulphur (or on a sulphur donor) and on a primary vulcanization accelerator. Various known secondary vulcanization accelerators or vulcanization activators, such as zinc oxide, stearic acid or equivalent compounds, or guanidine derivatives (in particular diphenylguanidine) are added to this base vulcanization system, incorporated during the first non-productive phase and/or during the productive phase as described later on.

The sulphur is used at a preferred content of between 0.5 and 12 phr, in particular between 1 and 10 phr. The primary vulcanization accelerator is used at a preferred content of between 0.5 and 10 phr, more preferably between 0.5 and 5.0 phr.

Use may be made, as (primary or secondary) accelerator, of any compound capable of acting as an accelerator for the vulcanization of diene elastomers in the presence of sulphur, in particular accelerators of the thiazole type and also derivatives thereof, and accelerators of thiuram and zinc dithiocarbamate type. These accelerators are, for example, selected from the group consisting of 2-mercaptobenzothiazyl disulphide (abbreviated to "MBTS"), tetrabenzyl thiuram disulphide ("TBZTD"), N-cyclohexyl-2-benzothiazyl sulphenamide ("CBS"), N,N-dicyclohexyl-2-benzothiazyl sulphenamide ("DCBS"), N-tert-butyl-2-benzothiazyl sulphenamide ("TBBS"), N-tert-butyl-2-benzothiazyl sulphenimide (abbreviated to "TBSI"), zinc dibenzyldithiocarbamate ("ZBEC") and mixtures of these compounds.

The final composition thus obtained is then calendered, for example in the form of a sheet or slab, especially for laboratory characterization, or else extruded in order to form for example a rubber profiled element used for the manufacture of semi-finished products such as tire treads.

The vulcanization (or curing) is carried out in a known manner at a temperature generally between 120° C. and 200° C., for a sufficient time that may vary, for example, between 5 and 90 min depending in particular on the curing temperature, the vulcanization system used and the vulcanization kinetics of the composition in question.

Thus, the compositions in accordance with the invention may advantageously constitute the tread of tires and in particular of tires intended for civil engineering. The latter may also constitute only one portion of the tire tread in the form of a stripe or drain located for example in the central circumferential region of the tire and/or at the shoulders of the tread.

The following examples illustrate the invention without, however, limiting it.

EXEMPLARY EMBODIMENTS OF THE INVENTION

Preparation of the Rubber Compositions

The tests below are carried out in the following manner: introduced into an internal mixer, filled to 70%, and the initial vessel temperature of which is around 90° C., are the diene elastomer, the filler (carbon black and silica) followed, after kneading for one to two minutes, by the various other additives, with the exception of the vulcanization system. Thermomechanical working (non-productive phase) is then carried out in one stage (total duration of the kneading equal to around 5 min), until a maximum "dropping" temperature of around 165° C. is reached. The mixture thus obtained is recovered and cooled and then the vulcanization system (sulphur and a sulphenamide accelerator) is added to an external mixer (homo-finisher) at 70° C., by compounding the combined mixture (productive phase) for around 5 to 6 min.

The compositions thus obtained are then calendered either in the form of slabs (thickness of 2 to 3 mm) or thin sheets of rubber for the measurement of their physical or mechanical properties. The vulcanization (or curing) is carried out at 120° C. for 300 minutes.

Test 1

The objective of this test is to demonstrate the improvement in the thermal conductivity and hysteresis properties of a composition according to invention with respect to a control composition.

The two compositions A1 and B1 were prepared in accordance with the process explained in detail in the preceding section and have the same base formulation below where the amounts are expressed in phr, parts by weight per hundred parts of elastomer:

| | |
|---|---|
| Elastomer (1) | 100 |
| Antioxidant (2) | 1.5 |
| Paraffin | 1 |
| PEG (3) | 2.5 |
| Zinc oxide | 3 |
| Stearic acid | 1.5 |
| Sulphenamide (4) | 1.1 |
| Sulphur | 1.7 |

(1) Natural rubber
(2) 6PPD N-1,3-dimethylbutyl-N-phenyl-para-phenylenediamine ("Santoflex 6-PPD" from the company Flexsys)
(3) Polyethylene glycol: "CARBOWAX 8000" sold by the company Dow Corning
(4) N-cyclohexyl-2-benzothiazylsulphenamide ("Santocure CBS" from the company Flexsys)

Compositions A1 and B1 are defined as follows:
  the control composition A1 is a "conventional" tire tread composition for a civil engineering vehicle tire that includes a blend of N115 carbon black (not derived from acetylene) and silica,
  the control composition B1 in which all of the N115 carbon black has been replaced by an acetylene-derived carbon black.

The differences in formulation, in phr, between the two compositions are presented in Table 1 below:

TABLE 1

| Composition No. | A1 | B1 |
|---|---|---|
| Carbon black (4) | 40 | — |
| Acetylene-derived carbon black (5) | — | 40 |
| Silica (6) | 15 | 15 |

(4) N115 sold by the company Cabot Corporation
(5) "Denka black" sold by the company Denki Kagaku Kogyo
(6) Silica: "Ultrasil ULTRASIL VN3SP" sold by the company Evonik The results obtained from these two compositions are presented in the following table:

TABLE 2

| Composition No. | A1 | B1 |
|---|---|---|
| Properties before curing | | |
| Mooney | 95 | 96 |
| Properties after curing | | |
| Tan $(\delta)_{max}$ | 0.187 | 0.112 |
| Thermal conductivity $(\lambda)$ | 0.274 | 0.368 |

It is observed that composition B1 in accordance with the invention, in which the carbon black N115 has been replaced by an acetylene-derived carbon black, has, as would be expected, an improved thermal conductivity (λ value has increased) but also, surprisingly, an improved hysteresis (reduction of tan $(\delta)_{max}$), compared to the control composition A1.

Test 2

The objective of this test is to demonstrate another advantage surprisingly obtained with some of the compositions in accordance with the invention, by comparing two compositions in accordance with the invention that have good thermal conductivity and hysteresis properties.

The two compositions B2, identical to composition B1 from test 1, and C2 were prepared in accordance with the process explained in detail above and have the same base formulation identical to that given in test 1.

Compositions B2 and C2 are in accordance with the present invention, they respectively comprise a blend of acetylene-derived carbon black and silica, with contents in accordance with the invention.

The differences in formulation, in phr, between the two compositions are presented in Table 3 below:

TABLE 3

| Composition No. | B2 | C2 |
|---|---|---|
| Carbon black (4) | — | — |
| Acetylene-derived carbon black (5) | 40 | 32 |
| Silica (6) | 15 | 23 |
| % Si (7) | 27 | 41 |

(7) silica content as weight fraction with respect to the total filler of the composition The results obtained from these two compositions are presented in Table 4 below:

TABLE 4

| Composition No. | B2 | C2 |
|---|---|---|
| Properties before curing | | |
| Mooney | 96 | 99 |
| Properties after curing | | |
| Energy at break | 15696 | 25581 |
| Tan $(\delta)_{max}$ | 0.112 | 0.117 |
| Thermal conductivity (λ) | 0.368 | 0.339 |

It is observed that composition C2 in accordance with the invention has, like composition B2 in accordance with the invention, a good thermal conductivity (λ value) and a low hysteresis (tan $(\delta)_{max}$).

It is also observed, surprisingly, that composition C2, having a silica content greater than that of composition B2, permits with respect to composition B2, a significant improvement in the energy at break even though the amount of total filler is identical.

The invention claimed is:

1. A rubber composition based on at least one diene elastomer, a filler that comprises carbon black and an inorganic filler, and a crosslinking system,
wherein the inorganic filler content is from 8 to 30 parts by weight per hundred parts by weight of elastomer, phr, and represents at most 50% as a weight fraction of the total filler of the composition
wherein the carbon black comprises at least one acetylene-derived carbon black, wherein the acetylene-derived carbon black content is from 10 to 40 phr,
wherein the amount of acetylene-derived carbon black represents more than 50% of the carbon black present in the composition as a weight fraction, and
wherein the composition comprises a plasticizing oil, aplasticizing resin, or both, with a total content of plasticizing oil and plasticizing resin of less than 30 phr.

2. The rubber composition according to claim 1, wherein the amount of acetylene-derived carbon black represents more than 50% of the total filler present in the composition, as a weight fraction.

3. The rubber composition according to claim 1, wherein the inorganic filler content represents more than 30% as a weight fraction of the total filler of the composition.

4. The rubber composition according to claim 3, wherein the inorganic filler content represents more than 40% as a weight fraction of the total filler of the composition.

5. The rubber composition according to claim 1, wherein the amount of acetylene black represents more than 90% of the carbon black present in the composition, as a weight fraction.

6. The rubber composition according to claim 1, wherein the inorganic filler comprises silica.

7. The rubber composition according to claim 6, wherein the silica is a precipitated silica.

8. The rubber composition according to claim 6, wherein the inorganic filler consists of silica.

9. The rubber composition according to claim 1, wherein the total filler content is from 20 to 150 phr.

10. The rubber composition according to claim 1, wherein the acetylene-derived carbon black content is equal to 10 phr.

11. The rubber composition according to claim 1, wherein the inorganic filler content is equal to 8 phr.

12. The rubber composition according to claim 1, wherein the inorganic filler content is from 12 to 30 phr.

13. The rubber composition according to claim 1, wherein the total content of plasticizing oil and plasticizing resin is from 0 to 5 phr.

14. The rubber composition according to claim 1, wherein the diene elastomer is selected from the group consisting of polybutadienes, synthetic polyisoprenes, natural rubber, butadiene copolymers, isoprene copolymers and mixtures of these elastomers.

15. A finished or semi-finished article comprising a rubber composition according to claim 1.

16. A tire tread comprising, at least partially, a rubber composition according to claim 1.

17. A tire or semi-finished product comprising at least one rubber composition according to claim 1.

* * * * *